May 31, 1960 W. HOFLER 2,938,275
METHOD AND APPARATUS FOR MEASURING GEARS AND THE LIKE
Filed Sept. 4, 1956 2 Sheets-Sheet 1
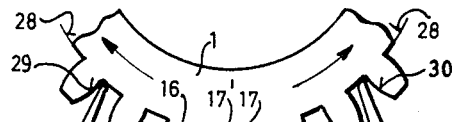
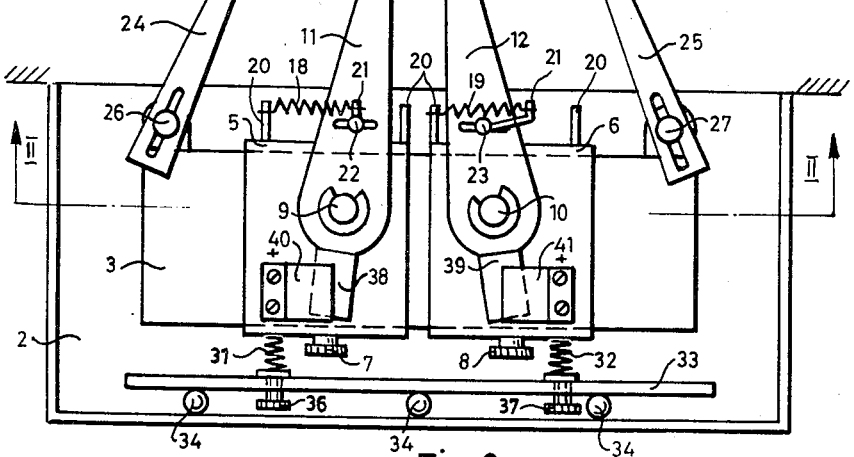
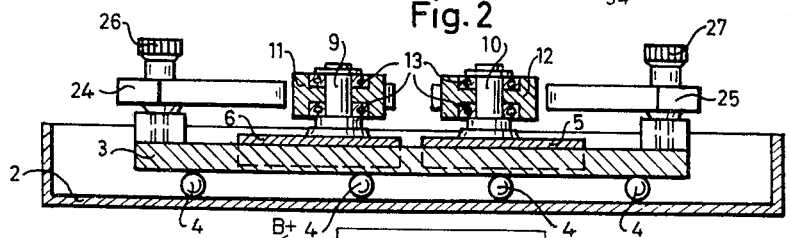
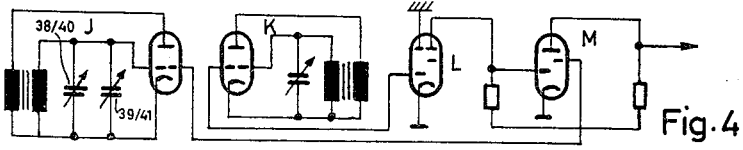
INVENTOR.
Willy Hofler
BY
Bailey, Stephens-Huettig
Attorneys

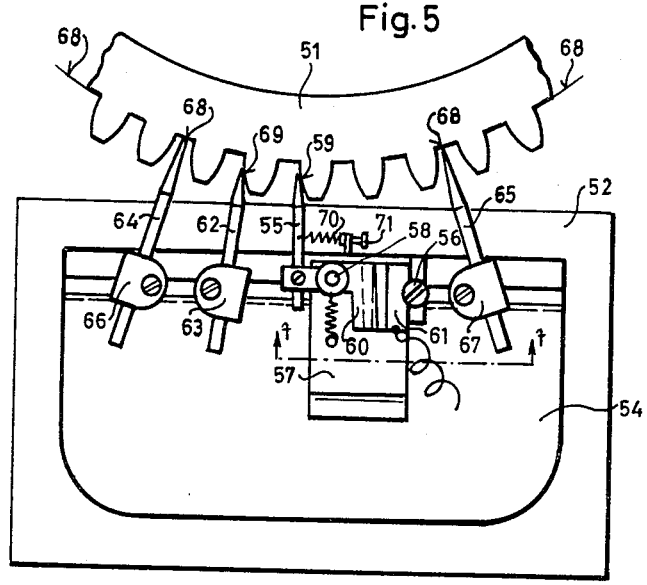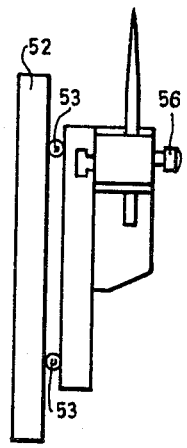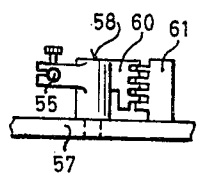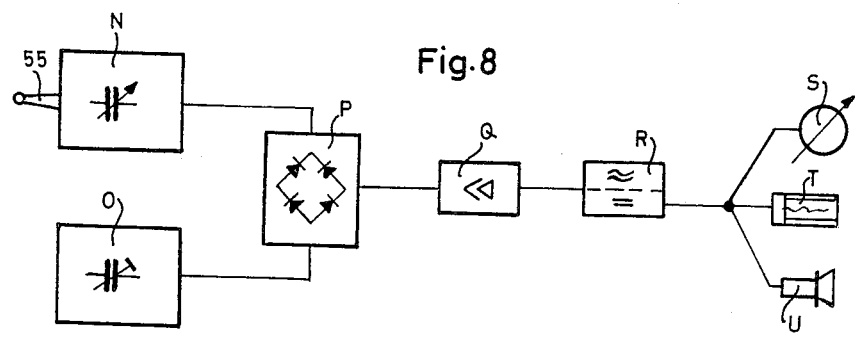

United States Patent Office 2,938,275
Patented May 31, 1960

2,938,275

METHOD AND APPARATUS FOR MEASURING GEARS AND THE LIKE

Willy Höfler, Kriegsstrasse 290, Karlsruhe, Baden, Germany

Filed Sept. 4, 1956, Ser. No. 607,891

Claims priority, application Germany Sept. 7, 1955

20 Claims. (Cl. 33—179.5)

The present invention relates to a method and apparatus for measuring recurring distances, particularly on gears, racks, gear cutters, and the like, and for comparing such distances with each other so as to test the uniformity thereof. More specifically, the invention relates to such method and apparatus wherein the distance to be measured, for example, the thickness of gear teeth and the width of tooth gaps, is scanned by two feelers, at least one of which is pivotable.

In the methods and apparatus of this type known prior to this invention, the measured values have usually been transmitted to indicating gauges by mechanical means, the result of such mechanical transmission being a very limited degree of accuracy of the indication. Furthermore, such prior methods required that the feelers had to be removed from the tooth gaps after each measurement, and the object to be measured then had to be shifted by one tooth so as to permit the feelers to be newly inserted in the next tooth gap for carrying out the next measurement. This procedure required a considerable length of time, especially if a large number of measurements had to be carried out on each test object. Furthermore, it required a special testing instrument to insure that the test object was advanced after each measurement by exactly one full division or pitch, and that the feelers were inserted into the tooth gaps to exactly the same depth at each measurement. Also, because of a lack of suitable testing instruments, it was not possible to measure very large objects, and parts of machinery such as gears, racks, gear-cutting tools, and the like could only be measured with considerable difficulties unless they were first dismounted from the respective machine.

The principal objects of the present invention consist in providing a method and apparatus which will overcome the above-mentioned disadvantages and produce measurements of far greater accuracy than were possible in the previous methods and apparatus, considerably reduce the length of time required to carry out each measurement and series of measurements, and allow such measurements on large, as well as built-in parts.

A feature of the invention for attaining these objects consists in providing an appliance carrying the feelers which is moved during the measuring procedure together with the test object, in shifting such appliance after each measurement by one tooth pitch or other division to be measured while the test object preferably continues to move without interruption, and in evaluating the relative position of the feelers during the individual measuring steps by means of an electric length-measuring instrument which preferably operates by indicating variations in the capacity of a condenser. In such procedure, the appliance carrying the feelers may be brought into operative association with the test object so as to be carried along by the continuously moving test object. However, provision may also be made so that the appliance carrying the feelers may be moved manually in accordance with the constantly moving test object and in a fixed relation thereto.

Thus, the method according to the invention may be applied for carrying out a measurement on a test object even though such object moves continuously. After the measurement has been completed, the mechanism is then withdrawn from the measured gap and inserted into the adjacent gap while the movement of the test object continues. Thus, there is no longer any requirement for a special testing instrument which advances the test object between the individual measurements by exactly one division or pitch. The test objects may also be accurately measured even though they are of very large dimensions or are built into a machine. The mentioned capacity measurements have the further advantage of having an extremely high accuracy.

The essential features of the apparatus for carrying out the method according to the invention consist in providing the two feelers on a supporting plate which is movable in all directions within one plane in such a manner that it will trace or follow the continuous movement of the test object at a uniform distance therefrom; in maintaining such uniform distance between the test object and the supporting plate by providing the latter with two adjustable spacing pins which are adapted to engage with suitable surfaces of the test object; in providing at least one of the feelers with a condenser plate so that the distance between this and another condenser plate which is mounted in a stationary position on the supporting plate is adjustable by the pivoting movement of the feeler; and in evaluating the distance of the condenser plates from each other by means of a heterodyne circuit of a type which may be known as such, such distance then serving as a measurement for determining the distance between the surfaces of the test object to be measured. In order to adapt the new measuring appliance to the respective dimension to be measured, it has further been found advisable to mount at least one of the feelers on a slide which is adjustable on the supporting plate. Since the measuring procedure is carried out electrically, the contact pressure of the feelers on the surfaces to be measured needs only to be very slight, and such contact pressure is preferably obtained by placing the feelers, insofar as they are pivotably mounted, against the surfaces of the test object to be measured by means of a spring, the tension of which may be adjustable. The supporting plate should be easily and securely movable in all directions and for this reason preferably mounted by ball bearings on a horizontal base. Such movability allows the supporting plate together with the feelers and spacing pins to be inserted into the continuously moving test object and to be passed along the same in such position, or to be taken along by the test object without any change in the relative position of the supporting plate to the test object, so that the measurements will always be accurate despite the movement of the test object.

The feelers according to the invention may both be pivotably mounted on the supporting plate, and each of them may carry a condenser plate which cooperates with another condenser plate mounted on the supporting plate. These fixed condenser plates may be mounted in opposite directions to the two movable plates so that any pivotal movements of the feelers in the same direction will produce oppositely directed changes in capacity. Thus, a pivotal movement of the feelers in the same direction will reduce the distance of one movable condenser plate from the respective stationary condenser plate and enlarge the distance between the two other condenser plates. Angular movements of the feelers of equal magnitude are thus coordinated with equally large changes in the capacity of the two condensers but in opposite directions to each other so that the total capacity of the two condensers will remain unchanged. The electric length-measuring instrument may be of such design that the capacity of both condensers will be converted in a known manner into frequencies, and these frequencies will be superimposed to form an intermediate frequency and possibly be compared with an adjustable standard frequency, whereupon such frequency will then be amplified and converted to current or voltage values which will be registered, recorded, or made audible by suitable instruments. Naturally, in place of capacities, inductances may be used. Also, the electric measuring instrument may be replaced by a mechanical instrument, although such procedure is less advisable in view of the reduced measuring accuracy thereof and the inability or difficulty of recording the measured values.

Another embodiment of the invention consists in mounting only one of the two feelers so as to be pivotable and the other so as to be stationary but adjustable on the supporting plate, and in comparing the value of the capacity, which is variable by the pivotable feeler, in a manner known as such with that of an adjustable standard capacity, and converting the difference between the two values into a measuring value which is suitable for being registered or recorded. In either of the two embodiments of mounting the feelers as described, the supporting plate may be pressed against the test object by at least two springs of adjustable strength, and the spacing pins may be disposed so as to rest against the contact surfaces of the test object in such a manner that a movement of the test object will be transmitted to the supporting plate so as to take along such plate. When applying such embodiment, it is advisable if the springs which press the supporting plate against the test object are supported at their other side upon a straightedge which is slidable on ball bearings in a direction parallel or tangential to the direction of movement of the test object. However, the supporting plate may also be manually made to follow the continuously moving test object. In this case, after the measuring appliance with two pivotable feelers has been inserted into the test object, the spacing pins must engage the contact surfaces of the test object in a manner to insure that the relative position of the supporting plate to the test object will not vary. If, however, a measuring appliance with a stationary feeler is used and is guided manually to follow the movement of the test object, the fixed relative position between the supporting plate and the test object may be insured by the two spacing pins and the stationary feeler which may be adjusted so as to rest against one of the surfaces to be measured on the test object.

Further objects, features, and advantages of the present invention will appear from the following detailed description thereof which is to be read with reference to the accompanying diagrammatical drawings, in which—

Fig. 1 shows a plan view of a first embodiment of the measuring appliance according to the invention;

Fig. 2 shows a longitudinal section taken along line II—II of Fig. 1;

Fig. 3 shows a basic circuit diagram illustrating the underlying principle of an electric measuring instrument according to the invention operating with two measuring condensers;

Fig. 4 shows another basic circuit diagram according to a modification of the measuring instrument;

Fig. 5 shows a plan view of a second cembodiment of the measuring appliance according to the invention;

Fig. 6 shows a side view of the device according to Fig. 5;

Fig. 7 shows a detail view as seen along line 7—7 in Fig. 5; while

Fig. 8 shows a block diagram of a measuring appliance operating with only one measuring condenser.

Referring to the drawings, and first particularly to Figs. 1 and 2, the test object to be measured which is to be moved continuously in any suitable manner consists in this example of a continuously rotating gear 1. If a rack is to be measured it would be moved in its longitudinal direction. The new measuring appliance comprises a horizontal base plate 2 which supports a supporting plate 3 on balls 4 so as to be freely movable in all directions within a horizontal plane. Supporting plate 3 carries two slides 5 and 6 which are adjustable transversely and may be secured in a fixed position relative to each other by setscrews 7 and 8. Slides 5 and 6, in turn, carry pivot pins 9 and 10, respectively, for pivotally supporting a pair of feelers 11 and 12 on ball bearings 13. The ball-shaped ends 14 and 15 of feelers 11 and 12, respectively, project into two adjacent tooth gaps of gear 1 and engage resiliently with corresponding tooth faces 16 and 17 of two adjacent teeth, for example, at the height of the pitch line. In this case, the distance between each pair of adjacent tooth faces running in the same direction, i.e. the circular pitch of the teeth, is to be measured. If, on the other hand, the feeler ball 14 is placed against the tooth face 17', the tooth thickness may be measured, while when placing the feeler ball 14 against face 16, as shown in Figs. 1 and 2, and feeler ball 15 against face 17', the width of the tooth gaps may be measured. The resilient pressure of springs 18 and 19 under which the feeler balls 14 and 15 engage tooth faces 16 and 17, respectively, may be adjusted by shifting one of the two supporting pins 20 or 21 of each spring in the longitudinal direction thereof and by then securing such pins by set screws 22 and 23 so as to vary the tension of springs 18 and 19. Although, for this purpose, Fig. 1 shows pin 21 on feelers 11 and 12 as being adjustable thereon, the same result may be attained if the opposite end of each spring 18 or 19 is made adjustable, for example, by mounting supporting pins 20 on slides 5 and 6 so as to be clamped in different positions thereon. These pins 20 are preferably provided on both sides of each of feelers 11 and 12 to permit one or both springs 18 and 19 to be switched over from one side to the other if another type of measurement is to be carried out and one or both feeler balls 14 and 15 are to engage in the other direction.

Supporting plate 3 further carries at its opposite ends a pair of spacing pins 24 and 25 which may be adjusted in any suitable position to the gear 1 and be clamped tight in such adjusted position by setscrews 26 and 27, respectively. The relatively pointed ends of spacing pins 24 and 25 are placed in engagement with both the root 28 of the teeth and the opposite tooth flanks 29 and 30 so as definitely to determine the position of supporting plate 3 relative to the test object, i.e. gear 1. Supporting plate 3 is resiliently urged toward the test object by means of springs 31 and 32 which are supported by a straightedge 33 and are mounted thereon by means of adjusting screws 36 and 37, respectively to permit their initial tension to be adjusted. Straightedge 33, in turn, is easily movable tangentially to the direction of movement of test object 1 by being supported on balls 34 which are adapted to roll along a vertical back wall 35 of base plate 2.

At their end opposite to feeler balls 14 and 15, the pivotable feelers 11 and 12 carry condenser plates 38 and 39, respectively, which cooperate with stationary condenser plates 40 and 41 on slides 5 and 6 so as to form variable condensers. A pivotal movement of feelers 11 and 12 then changes the position of condenser plates 38 and 39 relative to the stationary plates 40 and 41 and thus varies the capacity of each condenser 38, 40 and 39, 41. As shown in Fig. 1, condenser plates 40 and 41 are disposed in oposite directions to each other relative to the pivotal condenser plates 38 and 39 so that at an equal pivotal movement of both feelers 11 and 12 in the same direction, equal but oppositely directed changes in capacity of condensers 38, 40 and 39, 41 will result, and the total capacity of both condensers will remain unchanged. As shown in Fig. 3, the capacity values of condensers 38, 40 and 39, 41 are each converted in a separate oscillating circuit into frequency values, superimposed in a mixer stage C, amplified in an amplifier stage D, converted into current and voltage values in a transformer stage E, and finally evaluated by means of a registering instrument F, a recording instrument G, or a loudspeaker H.

Fig. 4 illustrates a different circuit diagram in which the two condensers 38, 40 and 39, 41 lie in a common oscillating circuit J so as to produce an intermediate frequency corresponding to the difference in the capacity values which is then compared in a mixer stage L with an adjustable standard frequency which is produced in an oscillating circuit K. After amplifying such frequency in an amplifier stage M and converting it into current and voltage, an evaluation may be carried out similarly as described with reference to Fig. 3.

The operation of the entire measuring system is as follows:

The partciular arrangement of the measuring appliance shown in Fig. 1 relative to the test object 1 results in certain capacity values of condensers 38, 40 and 39, 41 of a size in accordance with the distance to be measured between the tooth faces 16 and 17, which values may then be measured and evaluated by an electric measuring instrument as illustrated in Figs. 3 or 4. If the test object 1, for example, a gear, rotates during the measuring procedure, the relative position of supporting plate 3 and thus also of feeler balls 14 and 15 to the test object 1 remains unchanged since the movement of the latter is transmitted by the spacing pins 24 and 25 to the supporting plate 3 which is thus pressed into engagement with test object 1 by springs 31 and 32 and carried along by the test object without any change in the relative position between the latter and the measuring appliance. After the measurement has been completed, supporting plate 3 may be retracted against the action of springs 31 and 32, and feeler balls 14 and 15 or feelers 11 and 12 may then be inserted together with spacing pins 24 and 25 into the next following tooth gaps of the rotating test object. The constant pressure of spacing pins 24 and 25 against test object 1 by springs 31 and 32 insures that in the next measurement the same relative position of the measuring device to the test object will be attained as in the preceding measurement. If there should be any variation in the distance of the measured surfaces, i.e. of the tooth faces 16 and 17, feelers 11 and 12 vary their position relative to each other by pivoting about the pivot pins 9 and 10, whereby the capacity of condensers 38, 40 or 39, 41 will likewise be changed. This change in capacity will then be evaluated and registered by the electric measuring instrument in a manner depending upon the type of circuit used, that is, either by ascertaining the absolute values of the measured distance or the deviations from a standard value. Obviously, in place of capacities, inductances may be used with equal results. Also, if the measuring accuracy required does not have to be as high, a mechanical measuring instrument may be used in place of the electrical instrument.

A second embodiment of the invention is illustrated in Figs. 5 to 8, in which the measuring appliance has only one pivotable feeler which is moved manually along the continuously moving test object 51. Here again a supporting plate 54 rests on balls 53 on a base plate 52 so as to be freely movable in all directions within the same plane. Supporting plate 54 carries a slide 57 which may be adjusted in a transverse direction and secured in position by a setscrew 56, and which carries a pivot pin 58 on which a feeler 55 is pivotably mounted. Feeler 55 forms a bell crank, the relatively pointed feeler end of which is adapted to engage with the tooth face 59 of test object 51. The opposite end of feeler 55 carries a condenser plate 60 which cooperates with a stationary condenser plate 61 on slide 57 so that, when feeler 55 pivots about pin 58, the capacity of the condenser 60, 61 will be changed. Supporting plate 54 further carries a second feeler 62 which is adjustably secured thereto and in a fixed position thereon by means of a clamping member 63, and it also carries two adjustable spacing pins 64 and 65 which are similarly secured thereto by clamping members 66 and 67. Fig. 7 illustrates one preferred design of the condenser with the condenser plates 60 and 61 interengaging or combing each other.

In the operation of the measuring appliance according to Fig. 5, supporting plate 54 is manually moved toward the test object 51 until the tips of spacing pins 64 and 65 engage with the root 68 of the teeth. Plate 54 is then shifted laterally until the front end of the stationary feeler 62 engages with the tooth face, and then moved to follow the rotating test object 51. In order to maintain the pivotable feeler 55 in engagement with tooth face 59, a spring 70 is provided, the initial tension of which may be adjusted by a setscrew 71 to allow for any desired contact pressure of feeler 55. The capacity of condenser 60, 61 produces a measuring frequency in an oscillating circuit N which may be compared in a heterodyne stage P with an optional standard frequency produced in an oscillating circuit O, and amplified in an amplifier stage Q, whereupon, after being converted in a transformer stage R, it is conducted to an indicating instrument S, a recording instrument T, or a loudspeaker U. The operation of this measuring appliance is therefore similar to that shown in Figs. 1 to 4, except for the fact that the supporting plate 54 must be moved manually to follow the rotating test object 51.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of measuring recurrent distances, particularly on gears and the like, comprising the steps of moving a test object in one direction, holding an appliance in engagement with the test object and moving the appliance simultaneously with and at the same speed in the same general direction as said test object and at a uniform distance therefrom, the movement of the appliance being produced by its engagement with the test object and by the movement of the test object, measuring the distance between two surfaces of said test object by scanning the same by means of two feelers mounted on said appliance and at least one of said feelers being pivotable thereon, shifting said appliance including said feelers to the next pair of surfaces to be measured on said test object after the first measurement has been completed, evaluating the position of said two feelers relative to each other during each measurement, and registering the results of each evaluation.

2. A method of measuring recurrent distances, particularly on gears and the like, comprising the steps of moving a test object continuously in one direction, connecting an appliance to said test object so as to move simultaneously with and at the same speed in the same general direction as said test object and at a uniform distance therefrom, measuring the distance between two surfaces of said test object by scanning the same by means of two feelers mounted on said appliance and at least one of said feelers being pivotable thereon, shifting said appliance including said feelers to the next pair of surfaces to be measured on said moving test object after the first measurement has been completed, evaluating the position of said two feelers relative to each other during each measurement, and electrically registering the results of each evaluation.

3. A method of measuring recurrent distances, particularly on gears and the like, comprising the steps of moving a test object in one direction, holding an appliance in engagement with the test object and moving the appliance simultaneously with and at the same speed in the same general direction as said test object and at a uniform distance therefrom, the movement of the appliance being produced by its engagement with the test object and by the movement of the test object, measuring the distance between two surfaces of said test object by scanning the same by means of two feelers mounted on said appliance and at least one of said feelers being pivotable thereon, shifting said appliance including said feelers to the next pair of surfaces to be measured on said moving test object after the first measurement has been completed, converting the distances derived at each measurement from the relative position of said two feelers to each other into electric capacitative values, converting said values into current values, and electrically registering the same.

4. An apparatus for measuring recurrent distances on a moving gearlike object mounted for movement in one direction, comprising an appliance, means fixed on said appliance engageable with the object to limit movement of the appliance towards the object and to impart movement of the object to the appliance when said means engage the object, whereby to cause the appliance to move simultaneously with and at the same speed in the same general direction as said object and at a uniform distance therefrom, a pair of feelers mounted on said appliance, at least one of said feelers being pivotably mounted thereon, each of said feelers being adapted to be placed in engagement with a surface on said object for measuring the distance between said surfaces, means mounting said appliance including said feelers for free movement in directions at right angles to each other in the plane of the gearlike object to permit retracting movement away from said moving object after each measurement and returning movement to the former position so as to engage said feelers with the next pair of surfaces on said object to measure their distance from each other, said fixed means being independent of said feelers, and means for registering the result of each measurement.

5. An apparatus for measuring recurrent distances on a moving gearlike object mounted for movement in one direction, comprising an appliance having a pair of feelers thereon adapted to engage with a pair of surfaces on said object for measuring their distance from each other, means fixed on said appliance engageable with said object to limit movement of the appliance toward the object and to impart movement of the object to the appliance when said means engage the object, whereby to cause the appliance to move simultaneously with and at the same speed in the same general direction as said object and at a uniform distance from said object, at least one of said feelers being pivotably mounted on said appliance, at least one variable condenser, means for connecting said pivotably mounted feeler with said condenser for varying the capacity thereof in accordance with the position of said feelers relative to each other, means mounting said appliance including said feelers for free movement in directions at right angles to each other in the plane of the gearlike object to permit retracting movement away from said moving object after each measurement and returning movement to the former position so as to place said feelers into engagement with the next pair of surfaces on said object to measure their distance from each other, said fixed means being independent of said feelers, and means for registering said capacity.

6. An apparatus for measuring recurrent distances on a moving gearlike object mounted for movement in one direction, comprising an appliance having a pair of feelers thereon adapted to engage with a pair of surfaces on said object for measuring their distance from each other, means fixed on said appliance engageable with the object to limit movement of the appliance towards the object and to enable movement of the object to the appliance when said means engage the object, whereby to cause said appliance to move simultaneously with and in the same general direction as said object and at a uniform distance therefrom, at least one of said feelers being pivotably mounted on said appliance, at least one variable condenser, means for connecting said pivotably mounted feeler with said condenser for varying the capacity thereof in accordance with the position of said feelers relative to each other, means mounting said appliance including said feelers for free movement in directions at right angles to each other in the plane of the gearlike object to permit retracting movement away from said moving object after each measurement and returning movement to the former position so as to place said feelers into engagement with the next pair of surfaces on said object to measure their distance from each other, and means for registering said capacity.

7. An apparatus for measuring recurrent distances on a moving gearlike object mounted for movement in one direction, comprising an appliance having a pair of feelers thereon adapted to engage with a pair of surfaces on said object for measuring their distance from each other, at least one of said feelers being pivotably mounted on said appliance, a pair of arms fixed on said appliance engageable with said object to limit movement of the appliance towards the object and to impart movement of the object to the appliance when said arms engage the object, whereby to cause said appliance to move at a uniform distance from said object and simultaneously with and in the same general direction as said object, at least one variable condenser having a plate connected to said pivotably mounted feeler so as to be movable thereby and a plate secured in a fixed position relative to said appliance, means mounting said appliance including said feelers for free movement in directions at right angles to each other in the plane of the gearlike object to permit retracting movement away from said moving object after each measurement and returning movement to the former position so as to place said feelers into engagement with the next pair of surfaces on said object to measure their distance from each other, said fixed means being independent of said feelers, and means for registering the capacity of said condenser in accordance with the position of said feelers relative to each other and for comparing the results of the individual measurements with each other.

8. An apparatus as defined in claim 4, wherein said appliance comprises a supporting plate freely movable within such plane so as to be able to follow a continuous movement of said object at a uniform distance therefrom, and at least one slide adjustably mounted on said supporting plate and carrying one of said feelers.

9. An apparatus as defined in claim 4, wherein said appliance comprises a supporting plate freely movable within such plane so as to be able to follow a continuous movement of said object at a uniform distance therefrom, at least one slide adjustably mounted on said supporting plate and carrying said pivotably mounted feeler, and resilient means of adjustable strength acting upon said pivotably mounted feeler to place the same in resilient engagement with one of the surfaces to be measured on said object.

10. An apparatus as defined in claim 4, having a horizontal base wherein said appliance comprises a supporting plate freely movable on a plurality of balls on said base so as to be able to follow a continuous movement of said object at a uniform distance therefrom, at least one slide adjustably mounted on said supporting plate and carrying said pivotably mounted feeler, and resilient means acting upon said pivotably mounted feeler to place the same in resilient engagement with one of the surfaces to be measured on said object.

11. An apparatus as defined in claim 4, wherein said pivotably mounted feeler forms a two-armed lever, one end of said lever being adapted to engage one of the surfaces to be measured on said object, and a variable condenser having a plate secured in a fixed position relative to said supporting plate and a movable plate secured to the other end of said lever so that a pivotal movement of said feeler will vary the capacity of said condenser, and means for registering the capacity of said condenser.

12. An apparatus as defined in claim 4, wherein said appliance comprises a supporting plate freely movable on a plurality of balls so as to be able to follow a continuous movement of said object at a uniform distance therefrom, both of said feelers being pivotably mounted on said supporting plate, a pair of variable condensers each having a movable plate secured to one of said feelers and another plate secured to said supporting plate, said last condenser plates being disposed in opposite relation to each other so that pivotal movements of said feelers in one direction will produce oppositely directed changes in capacity of said condensers, and electric means for registering the capacity and changes in capacity of said condensers.

13. An apparatus as defined in claim 12, wherein said electric means comprise means for converting the capacity of said condensers into frequencies, for superimposing said frequencies to obtain an intermediate frequency, for amplifying said intermediate frequency, and converting the same into current values, and means for registering said values.

14. An apparatus as defined in claim 12, wherein said electric means comprise means for converting the capacity of said condensers into frequencies, for superimposing said frequencies to obtain an intermediate frequency, for comparing the latter with an adjustable standard frequency, and for amplifying said intermediate frequency and converting the same into current values, and means for registering said values.

15. An apparatus as defined in claim 4, wherein said appliance comprises a supporting plate freely movable within such plane so as to be able to follow a continuous movement of said object at a uniform distance therefrom, one of said feelers being pivotably mounted on said supporting plate and the other feeler being adjustably secured in a fixed position on said supporting plate, a variable condenser having a movable plate secured to said pivotably mounted feeler and another plate secured in a fixed position to said supporting plate, means for comparing the variable capacity of said condenser with an adjustable standard capacity, means for converting the difference in said capacities into a current value, and means for registering said value.

16. An apparatus as defined in claim 7, wherein said appliance comprises a supporting plate freely movable within such plane so as to be able to follow a continuous movement of said object at a uniform distance therefrom, said arms being adjustably mounted on said supporting plate, at least one slide adjustably mounted on said supporting plate and carrying said pivotably mounted feeler, and resilient means of adjustable strength for urging said supporting plate toward said object and to place said arms into engagement with said object so that the movement of said object will be transmitted by said arms to said supporting plate.

17. An apparatus as defined in claim 7 having a horizontal base with a vertical back, wherein said appliance comprises a supporting plate freely movable on a plurality of balls on said base so as to be able to follow a continuous movement of said object at a uniform distance therefrom, said arms being adjustably mounted on said supporting plate, at least one slide adjustably mounted on said supporting plate and carrying said pivotably mounted feeler, a straightedge freely movable on a plurality of balls on said back in a direction parallel to the direction of movement of said object, and resilient means of adjustable strength mounted on said straightedge and acting upon said supporting plate for maintaining said arms in resilient engagement with said object so that the movement of said object will be transmitted by said arms to said supporting plate.

18. An apparatus as defined in claim 17, wherein said straightedge and thus said supporting plate are movable in a direction tangential to the direction of movement of said object and without varying their distance relative to said object.

19. An apparatus as defined in claim 7, wherein said appliance comprises a supporting plate freely movable within one plane so as to be able to follow a continuous movement of said object, one of said feelers being pivotably mounted on said supporting plate and the other feeler being adjustably secured in a fixed position on said supporting plate, and fixed feeler and said arms being adapted to maintain said supporting plate at a uniform distance relative to said object.

20. An apparatus as defined in claim 4, wherein said appliance is adapted to be moved manually to follow the movement of said object and at uniform distance therefrom.

References Cited in the file of this patent

UNITED STATES PATENTS

| | | |
|---|---|---|
| 1,835,807 | Parker | Dec. 8, 1931 |
| 2,381,975 | Ernst | Aug. 14, 1945 |
| 2,509,185 | Eckel | May 23, 1950 |
| 2,775,041 | Pomernacki | Dec. 25, 1956 |

FOREIGN PATENTS

| | | |
|---|---|---|
| 209,793 | Great Britain | Jan. 22, 1924 |
| 605,041 | Germany | Nov. 2, 1934 |
| 597,296 | Great Britain | Jan. 22, 1948 |